Figure 1:
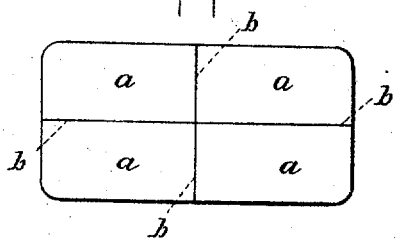

H. WAGNER.

CEMENTED LITHOGRAPHIC STONE.

APPLICATION FILED AUG. 3, 1909.

Reissued Feb. 22, 1910.

13,084.

WITNESSES

G. V. Rasmussen

R. Aberlin

INVENTOR

HUBERT WAGNER

BY

Bissell & Kraus

ATTORNEYS

UNITED STATES PATENT OFFICE.

HUBERT WAGNER, OF MUNICH, GERMANY, ASSIGNOR TO CHARLOTTENBURGER FARBWERKE AKTIENGESELLSCHAFT, OF CHARLOTTENBURG, PRUSSIA, GERMANY.

CEMENTED LITHOGRAPHIC STONE.

13,084. Specification of Reissued Letters Patent. Reissued Feb. 22, 1910.

Original No. 878,322, dated February 4, 1908, Serial No. 194,951. Application for reissue filed August 3, 1909. Serial No. 511,077.

*To all whom it may concern:*

Be it known that I, HUBERT WAGNER, a subject of the King of Bavaria, residing at Munich, N., Bavaria, Germany, have invented certain new and useful Improvements in Cemented Lithographic Stone, of which the following is a specification.

The object of the present invention is to provide lithographic stone composed of several separate pieces cemented by such means that the composite surface answers the many requirements of every printing process and possesses the requisite strength in the same degree as the surface of a single stone, and that the cementing produces no irregularities or flaws.

The object of the improvement is in the first place to allow of producing at very low cost, by the interconnection of small and inexpensive stones, large stones of sizes which in combination with the requisite quality for printing and complete freedom from flaws throughout their surfaces, are rarely found in the quarries and are therefore very expensive in a natural state; by carefully selecting the separate small stones the composite surface may even be of better quality than the surface of a single large stone of the natural size. Very large plates and blocks of stone such as would be required for the production of the larger rollers for rotary lithographic printing are not found at all in the quarries, or are at least extremely rare.

The printing surface of a composite plate or roller, produced by joining together the edges of separate parts, must answer the same numerous and various requirements as a plate consisting of a single natural homogeneous piece. The composite plate or roller must be very strong, in order to withstand the frequently very high pressure exerted thereon. Notwithstanding the great strength with which the separate pieces must be connected by the cemented parts, that is to say, at the joints or seams in the composite surface, the said joints must be infinitely fine, so as to be practically invisible to the naked eye. At those parts of the joints covered by the design the color must adhere in the same degree as to the stone. On the other hand, no color must adhere to the joints where the printing surface is to remain free from color. During the printing, the colors must be delivered to the paper by the seams in the colored parts of the plate or roller as readily and exactly as by the stone itself. It must be possible to treat the composite surface with caustic as uniformly as the surface of a single stone, without acid or water eating into the joints. Finally it must be possible to polish the entire plate with complete uniformity without producing lesions or cracks at the joints. As will be seen, the requirements are many and various. The composition or building up of a plate on roller from separate pieces, to possess a uniform surface, having with regard to the requirements stated, entirely the same physiological properties as a single homogeneous piece of stone, is effected in the following manner, reference being made to the accompanying drawing, in which—

Figure 2:
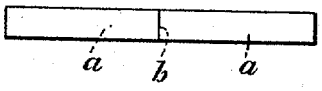
Figure 3:
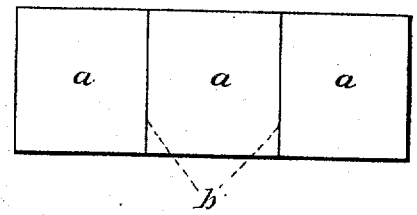
Figure 4:
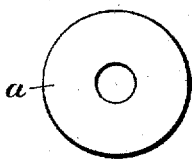
Figure 5:
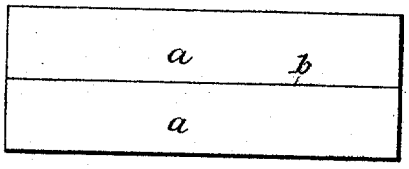
Figure 6:
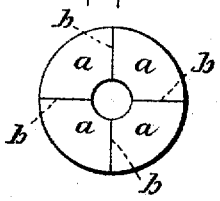

Figure 1 is a plan and Fig. 2 an edge view of a flat stone composed of four parts. Fig. 3 is an elevation and Fig. 4 an end view of a roller composed of three parts meeting on transverse planes, Fig. 5 is an elevation and Fig. 6 an end view of a roller composed of four parts meeting on longitudinal planes.

The edges of the separate lithographic stones *a* are smoothly polished so that the pieces fit well together. Roughening of the edges is unnecessary. The edges to be joined together are then coated with a cement *b* composed of 1 part shellac dissolved in 3 parts pure alcohol and 1 part sulfuric ether, with the addition of approximately ½ part pulverized lithographic stone. These mixing proportions can, however, be varied. After being placed together the stones are subjected to lateral compression in a suitable press until the mass has completely hardened, and the surface of the composite plate is then suitably polished.

Since the invention allows of producing rollers or cylinders as well as flat plates it thereby opens up another field of industry. Quite recently the inventor has started entirely new branches of industry (for instance, lithographic wall-paper printing and the like) by using, instead of the plano-lithographic printing of single sheets rotary printing of paper in web, by means of cylinders of lithographic stone. The construction of rollers, more particularly of rollers with perfect surfaces, with the limited material supplied by the generally flat strata of the quarries, was even more difficult than obtaining large flat plates. It has also been found necessary, in recent times, to have rollers of considerably larger diameter in order to perform rotary printing with success, since only a restricted utilization of that method of printing is possible with rollers which are at most 25 centimeters in diameter. By constructing rollers of separate segments joined together, rolls of very much larger diameter can be obtained, and by this means the output can be largely increased and wider scope obtained in the type of printing.

I am aware that it has been previously proposed to form flat stones out of several pieces cemented together but the methods hitherto proposed are insufficient to produce such a stone suitable for use.

I do not claim broadly the cementing of lithographic stones, but only such as are cemented by use of a cement having the characteristics quoted in my claims.

I therefore claim:

1. A lithographic plate or roller, comprising a plurality of lithographic stones united together by a mixture of shellac cement and powdered lithographic stone.

2. The combination in a lithographic plate or roller of separate pieces of lithographic stone and binding agent substantially consisting of shellac dissolved in alcohol and sulfuric ether and including powdered lithographic stone.

3. A lithographic plate or roller comprising a plurality of lithographic stones united by a mixture of cement and powdered lithographic stone.

4. A lithographic plate or roller comprising a plurality of lithographic stones united by a mixture of powdered lithographic stone and a binder.

In testimony whereof I have hereunto set my hand in the presence of two subscribing witnesses.

HUBERT WAGNER.

Witnesses:
ABRAHAM SCHLESINGER,
LOUIS MUELLER.